United States Patent

Hatanaka et al.

Patent Number: 5,926,177
Date of Patent: Jul. 20, 1999

[54] PROVIDING MULTIPLE VIEWS IN A MODEL-VIEW-CONTROLLER ARCHITECTURE

[75] Inventors: Iwao Hatanaka, Acton, Mass.; Stephen C. Hughes, Hyde Park, N.Y.

[73] Assignee: International Business Machines Corporation, Armonk, N.Y.

[21] Appl. No.: 08/953,583

[22] Filed: Oct. 17, 1997

[51] Int. Cl.[6] .................... G06F 3/14; G06F 3/03
[52] U.S. Cl. ................ 345/340; 345/356; 345/420
[58] Field of Search ............................. 345/340, 356, 345/357, 349, 302, 346; 706/934, 903, 908

[56] References Cited

U.S. PATENT DOCUMENTS

| 5,019,961 | 5/1991 | Addesso et al. ............... 345/357 X |
| 5,212,771 | 5/1993 | Gane et al. ........................ 345/357 |
| 5,261,044 | 11/1993 | Dev et al. ......................... 345/357 |
| 5,295,244 | 3/1994 | Dev et al. ......................... 345/357 |
| 5,428,782 | 6/1995 | White ................................ 295/650 |
| 5,495,610 | 2/1996 | Shing et al. ....................... 395/600 |
| 5,640,579 | 6/1997 | Koppolu et al. ............... 345/340 X |
| 5,742,777 | 4/1998 | Eick .................................. 345/326 |
| 5,761,674 | 6/1998 | Ito ................................ 345/357 X |
| 5,845,277 | 12/1998 | Pfeil et al. . |

OTHER PUBLICATIONS

"A Graphical Technique for Modeling Multi–User Data Requirements" Proceedings of the Twenty–Eighth Annual Hawaii Int. Conf. on System Sciences, Jan. 3–6, 1995, J. Parsons et al.

"Distributing Software in a Real–Time Process Control System" G. Bull et al, Proceedings of the IFIP WG 5.4/IFAC/EWICS Working conference, May 30–Jun. 1, 1988.

"Integrated Modeling of Distributed Object–Oriented Systems", D. Carver, Journal of System Software, vol. 26, No. 3, pp. 233–244.

"Metalevel Decomposition in AL–1/D".K. Okamura et al., Proceedings, Springer–Verlag, 543 PP., pp. 110–127, 1993.

*Primary Examiner*—John E. Breene
*Assistant Examiner*—Chadwick A. Jackson
*Attorney, Agent, or Firm*—Floyd A. Gonzalez

[57] ABSTRACT

A system, method and program product for controlling multiple appearances of data on a display. A Controller is provided for receiving user instructions for data to be displayed, and for generating model management and view management instructions for controlling the appearance of data to be displayed. A Model is connected to the Controller for receiving model management instructions from the Controller, and for keeping track of changes to the appearance of data to be displayed. A ViewProxy is connected to said controller for receiving view management instructions, and connected to said Model for receiving model change notifications responsive to changes in the appearance of data to be displayed. Multiple Views are connected to the ViewProxy for receiving model change notifications. The ViewProxy determines to which Views the model change notifications are to be sent, and sends model change information to only those Views affected by said model changes. A windowing system displays only active Views, and switches between Views by making at least one View active and selected other Views inactive.

8 Claims, 4 Drawing Sheets

PROVIDING MULTIPLE VIEWS IN A MODEL-VIEW-CONTROLLER ARCHITECTURE

The present invention is related to providing displays on a display device in a data processing system, and is more particularly related to providing multiple views on a display device in a model-view-controller architecture.

BACKGROUND OF THE INVENTION

When displaying, monitoring and exploring a complex system, a Model-View-Controller architecture is often adopted. The Model encapsulates all the complexities of the system and presents a crisp interface for interaction with it. The View manages the translation of system information to its presentation in the user interface, and the Controller manages interactions among the user, the model and the view. Frequently, however, there are changes to the type and form of the information that the View presents. It may change as the task the user performs evolves during the lifetime of the task. Or it may change depending on the specific task the user is performing.

For example, creating, executing and monitoring distributed applications that run on multiple hosts and are connected with a high speed data transport mechanisms such as the CLIO/S product from International Business Machines Incorporated of Armonk, N.Y., requires several views of many types of information. During initial development of the application, the user is interested primarily in the structural representation of the data flow among various applications of distributed hosts. When the application is initially run (before it is completely debugged), the user is interested in both the states of the components and the interconnections between components (for example, if a component appears to be stalled, it may be because it is not running correctly or it may be because the data it requires is not being delivered, or the data is generating is not being consumed). Once the application is complete and the user starts running it, the user is more interested in the specific state of the components of the application (whether job steps are running or stalled, whether data transfer is occurring, and, if so, the transfer rate). When a distributed application is complete and is being used in production, the user is less interested in the specific state of the components of the applications and more interested in an overall summary of the state of the distributed job. Controlling the overall application involves views that are similar to those required for monitoring because improperly affecting the control flow (such as abnormally terminating a component or restarting one out of sequence) can have a ripple effect that produces undesirable effects.

Unfortunately, a single View is not well suited to present all types of information. Graphical views are good for structure, but tend to become cluttered and unusable as specific textual information is added to them. List-type textual displays can present a lot of detailed information in a compact space, but give no information about structure. List-type textual displays are also ineffective for representing summary information (such as the progress the job is making toward completion). Measurement displays (such as bar graphs or meters) are ideal for presenting overall summaries, but give no information about structure or detailed states.

This problem has been addressed in the past in two ways. The first has been to choose a single view and add the additional information to it as needed. Typically a graphical view is chosen because it is initially easier to visualize the entire system, and mechanically it can accept the additional information that will be required later (it is easier to add text to a graphical view than graphics to a textual view). There is a practical limit to how much detailed information can be added to a graphical view as the screen real estate becomes cluttered and the information is obscured. In order to utilize this approach, a user must maintain the amount of detailed information below some threshold by selectively closing old detailed information as new information is requested.

The second approach has been to replace the View object in the Model-View-Controller configuration as the type of information the user is interested in changes. When the user is no longer interested in the structure of the distributed application and becomes interested in the detailed state of the components, the structure view is replaced with a detailed state view. The problem with this approach is that the new view must be recreated on demand and inserted into the Model-View-Controller configuration. Even if the old view is preserved when the user switches out of a particular mode (switching from structure to state views, for example), there is expense involved when the old view is reused (switching back to structure from state). The old view must be reconnected with the model and controller, and it must be made current to reflect any model changes that occurred when it was not active. This expense is enough to inhibit the user from switching between views freely.

SUMMARY OF THE INVENTION

The present invention provides for presenting many types of information efficiently. It is usable with the CLIO/S product available from International Business Machines Corporation of Armonk, N.Y., and is a tool designed to assist the development and execution of distributed CLIO/S Pipe Link applications. During the initial phase of specifying a CLIO/S Pipe Link network, many factors contribute to the network failing to operate as desired. These include failure of individual components (for various reasons), improper data/control flow among components and incorrect network specification. However, once the network is correctly specified, monitoring the progress of the application generally just requires observing the state of the individual components. Since the CLIO/S Application Linker of the present invention is required to address both ends of this range (as well as everything in between), a way to present both detailed and overview information as efficiently as possible is provided.

The CLIO/S Application Linker of the present invention implements the View of the Model-View-Controller architecture as a ViewProxy which looks like a view to the model and controller, but actually manages a collection of views. In the present implementation, there are at least two views, one graphical (icon view) and one textual (list view), but the architecture supports any number of views. The present invention provides that a user can switch between the views, depending on the type of information desired. The cost is only the cost of the windowing system to show and hide windows.

It is thus a primary object of the present invention to provide for presenting many types of information efficiently.

It is another object of the present invention to provide a ViewProxy in a Model-View-Controller architecture which looks like a view to the model and controller, but manages a collection of views.

It is another object of the present invention to provide for switching between views showing detailed and overview information of applications in a data processing system, depending on the type of information desired.

The foregoing and other objects, features and advantages of the invention will be apparent from the following more particular description of the preferred embodiment of the invention as illustrated in the drawings.

DETAILED DESCRIPTION OF THE PREFERRED EMBODIMENT

Figure 1:
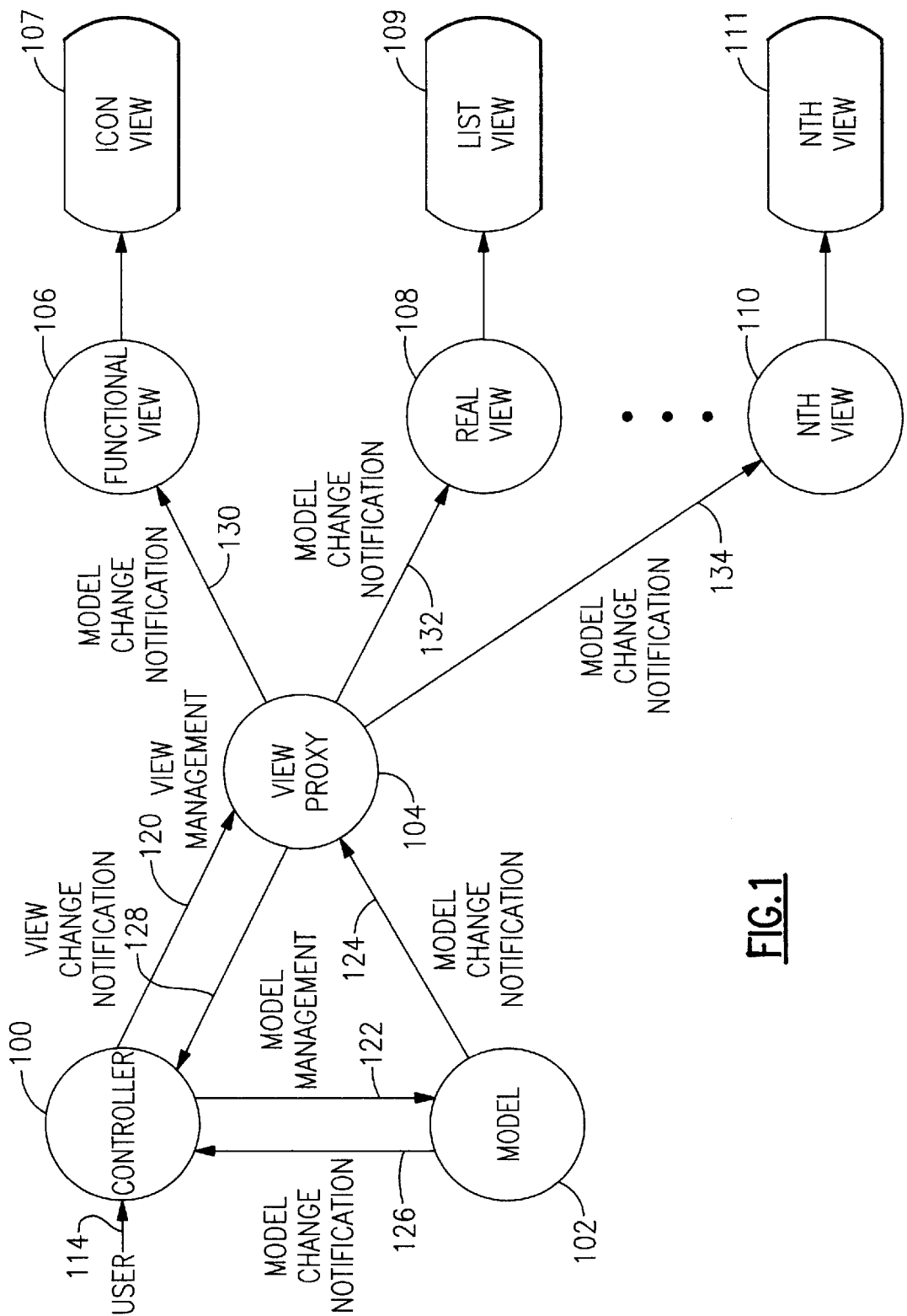
FIG. 1 is a block diagram illustrating the functional relationships between the Controller, Model, ViewProxy and Views of a program of the present invention.

FIG. 1 is a block diagram of the functional relationships between the elements of a program of the present invention which includes a Controller 100, a Model 102, a ViewProxy 104, a functional view 106, a real view 108, and possible additional views shown by an Nth view 110. Each of the views has an associated display; functional view 106 has a functional view display (icon view) 107, real view 108 has a real view display (list view) 109, and the Nth view 110 has an Nth view display 111. The Controller 100 has a user input 114 for initializing and providing changes to the views. The Controller 100 provides view management at 120 to the ViewProxy and model management at 122 to the Model 102. If the Model 102 is changed for any reason, model change notifications are sent at 124 to the ViewProxy and 126 to the Controller. If these changes cause any of the Views to be changed, as determined by the ViewProxy 104, a view change notification is sent by the ViewProxy 104 to the Controller 100 at 128. The ViewProxy can determine which model change notifications affect which views, and pass the model changes notifications to the affected views, as shown at 130 to the functional view 106, 132 to the real view, and 134 to the Nth view 110. Thus, the ViewProxy can provide two functions; a switch function wherein it determines which view to send data to, and a filter function wherein it determines what data is to be sent to a view.

One use of the CLIO/S Application Linker of the present invention is discussed and shown in U.S. patent application Ser. No. 08/898,305 filed Jul. 21, 1997 for MANAGING DISTRIBUTED COMPLEX TASKS EXECUTING WITHIN A COMPUTER ENVIRONMENT (attorney docket number PO9-97-011), assigned to the assignee of the present invention and incorporated herein by reference.

The ViewProxy implements the standard view interface in a Model-View-Controller architecture, namely: Object creation, Object destruction, Structural changes, Object state changes, Object selection/deselection, View object hide/show, and View object ordering. The ViewProxy manages a collection of actual View objects. Each of the Views is identical to a view in a normal Model-View-Controller architecture, and implements the described interface. These Views are not directly connected to the Model and Controller. The ViewProxy forwards all notifications it receives from the Model and Controller to each of the Views it manages, which, in turn, react in the same way they would have if they were in a regular Model-View-Controller architecture. For example, when the state of an object changes, the model notifies the view which, in a single view environment, would cause the display to change. In the multiple view environment of the CLIO/S Application Linker of the present invention, the Model notifies the ViewProxy, which notifies both the graphical structural view (the icon view in FIG. 1) and the textual detailed state view (the list view in FIG. 1). Both views change their display model to reflect the new state information, but the user only sees the change in the active display. If the user then requests the other display mode, no changes occur in the views themselves. Instead, the inactive display is made active in the windowing system, in a manner well understood by those skilled in the art, and the active one is made inactive. The user sees the new display with the updated state information. In addition, to the early update of the inactive displays (changing the display whenever the model changes even though the view is not visible), the Model-View-Controller of the present invention preserves the option to perform just-in-time display updates because the view has a record of all model changes that occurred since the last time it was active, and does not have to regenerate the entire view.

Figure 2:
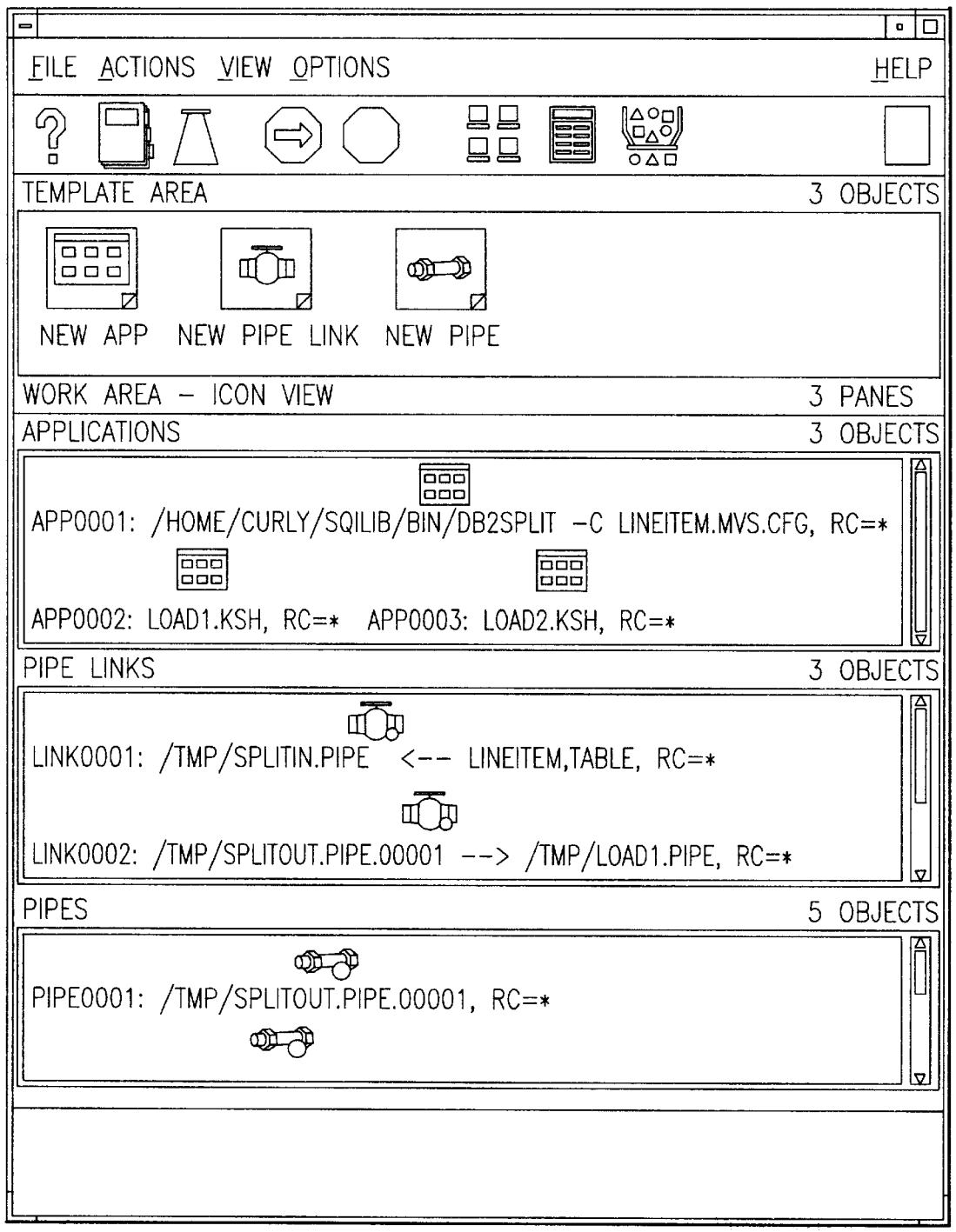
FIG. 2 is a graphical view or icon view of one of the Views of FIG. 1.
Figure 3:
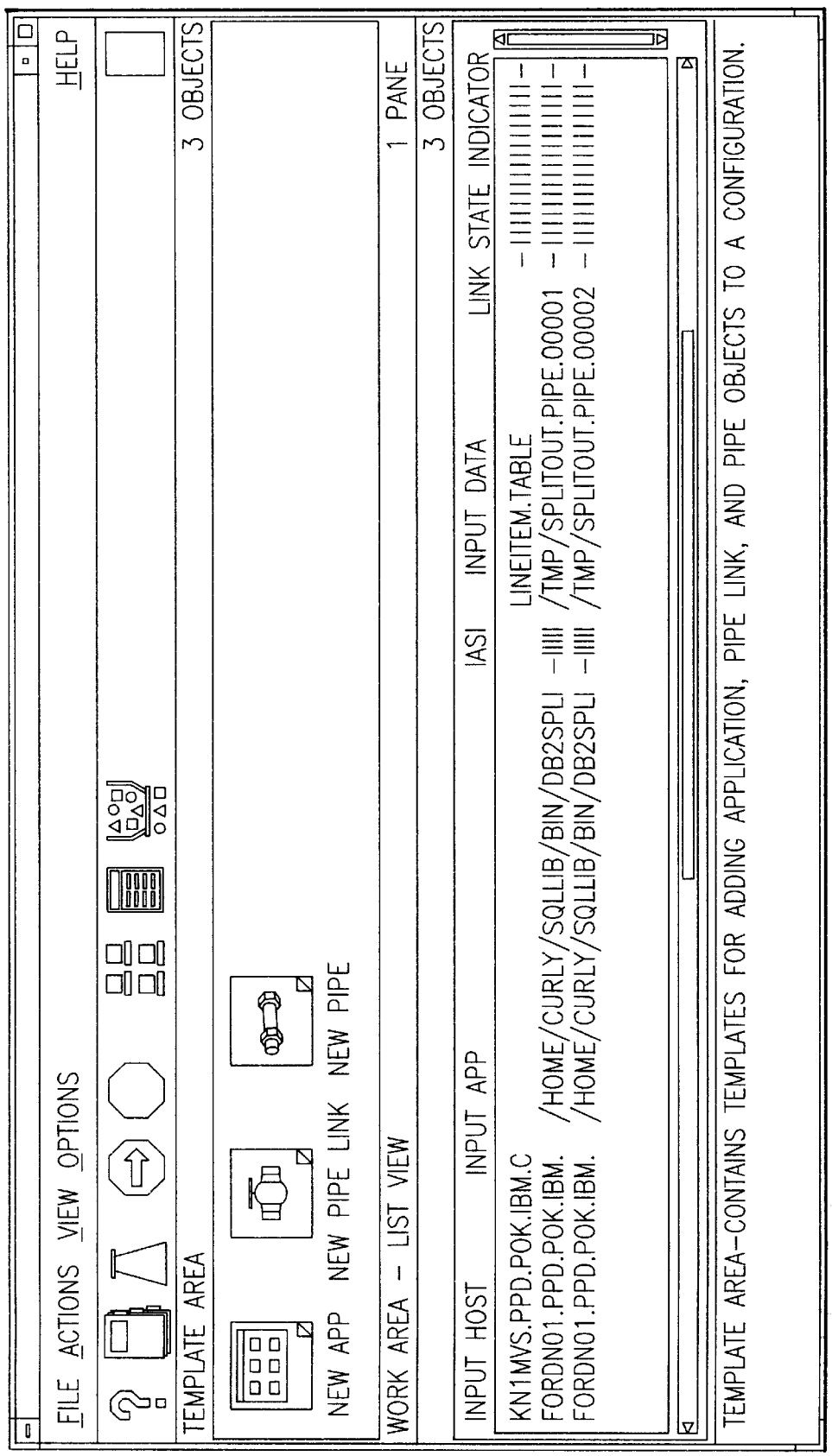
FIG. 3 is a textual or list view of one of the Views of FIG. 1.

By adding multiple views to the Model-View-Controller architecture of the present invention, peer displays are contained within a common operational framework that provides view-independent functionality such as creating and destroying components, starting and stopping the overall configuration and starting, stopping and querying individual components of the configuration. FIG. 2 and FIG. 3 show the graphical and textual views of the CLIO/S Application Linker. In FIGS. 2 and 3, it can be seen that the session controls menu bars are the same with the only difference being the area where the distributed application information is presented. Both display areas are driven by a single object model that maintains the state of the individual components and overall network. When the user is interested in a network overview, the user selects the graphical view and the network components are represented by icons with characteristics (color, form, image) that indicate the state of the component. In FIG. 2, the different icons give an immediate indication that the various objects are in different states, and the states may be immediately recognized. FIG. 3 is a textual view and gives more detailed information about each object. FIG. 3 presents detailed, quantitative information about specific component state, execution time, data transmission and execution environment. Specifically, for those objects that are running, how long they have been running, when they are likely to complete, and how much processing they have done. For those objects that are not running, whether they completed successfully and, if so, what their final execution statistics are. If they did not complete successfully, why not.

Because the same model is driving both views, and the views are aware of the state of the model object(s) that they represent, switching between views can be done quickly and there is no discrepancy between the data shown in the views.

Each of the individual classes for the applications, pipes and links is derived from a base class, referred to as Object, and will now be discussed. The Object class provides a common interface for managing the connectivity and dataflow in a network of objects. Specifically, this involves adding, retrieving and deleting inputs and outputs. It also includes querying whether an object is connected to an input or output and, if so, how many. The object also provides the interface and implementation for recording and supplying information about the real-world invocation that the object represents. This information includes, for instance, the state of the invocation (eg. Not started, starting, running, stopping, stopped, error or other internal states used in managing the invocation), the time it was started, any secondary invocations related to this object (eg. a data link from one host to another will have a primary invocation on one host and a secondary invocation on another), the host where the invocation is running and the path to get to that host (often one host is not directly accessible from another but there may be a third host (or other hosts) that is accessible by both), the number of real-world invocations used to implement this object and unique identifiers (eg. process or job id) for each, the operating system of the host where the real-world invocation resides, the completion code once an invocation has terminated and information about the data movement associated with an object file (eg. identifier(s), bytes transferred, bytes transferred since last interrupt, transfer rate, maximum transfer rate and time since last activity).

Derived from the Object class is an Application class which enhances the Object base class with data members that store input and output lists. The Application class also customizes the Object interface for updating an Application, validating an Application and working with the inputs and outputs of an Application.

In addition to deriving an Application class from the base Object class, a Link class is also derived from the Object base class. The Link class customizes the Object interface for updating a Link, validating a Link and working with the input and output of a Link. The Link object also maintains other information about characteristics of the data transfer that is used to physically accomplish the transfer but is not actually germane to the management of the transfer. Examples of this information are whether the data is ASCII or binary, whether data conversion is performed and the size of the intermediate buffers used to transfer the data.

A Pipe class is also derived from the Object base class. The Pipe class enhances the Object base class with data members that store pointers to an input object and an output object. It also has a data member that stores pipe direction. The Pipe class customizes the Object interface for updating a Pipe, validating a Pipe and working with the input and output of a Pipe.

An additional class is derived from the Object base class. This class is referred to as the Other class and represents data suppliers and consumers that are not under direct control of the complex task management capability of the present invention but are assumed to exist in the environment where the complex task is running. The Other class enhances the Object base class with a data member that stores the type of data object it represents (eg. files, datasets, tape devices and other storage media). A primary purpose of this class is to allow the user to explicitly specify that a data flow is originated or terminated so that validation does not need to flag it as incomplete.

Each object that represents a real-world object (Application, Pipe, Link and Other) has at least one object that provides its presentation or view to the user. The present invention has two views for each object: an Icon view and a List view. The view objects are ApplicationListView, ApplicationIconView, LinkListView, LinkIconView, PipeListView, PipeIconView, OtherListView and OtherIconView. Each view object has a data member that identifies its manager (eg. a ListViewManager or an IconViewManager) and a data member that identifies the object for which it is providing a view. The view object responds to directives from the view manager to perform generic presentation activities such as drawing itself, updating itself, erasing itself, scrolling and highlighting. How it performs those actions make up the characteristics that define what kind of view it is.

The real-world objects need to notify the view(s) when they change in a manner that may affect their presentation (eg. the object's state changes which may require a new icon or highlighting). The objects are not aware of their view objects but instead have a relationship to a ViewProxy object. The ViewProxy object is both object type independent and view type independent. That is, there is one ViewProxy object for each real-world object but there is only one ViewProxy class type for all object types and view types. The ViewProxy class object maintains a list of view objects for the object it represents for each of the views available. The real-world object is responsible for notifying the ViewProxy object whenever it (the real-world object) changes such that its presentation may have to change. The ViewProxy, in turn, notifies each of the view objects it has that the real-world object has changed. The view objects then determine whether the change affects how they present the object, possibly requesting more data from the real-world object. A dataflow view, for example, may change the pipe color if the data transfer speed changes but an icon view may not change anything. Finally, if the view determines that its presentation changed, it notifies its view manager. If its view is not active, the view manager will do nothing. If its view is active, the view manager may or may not enable the view to update its presentation to the user.

In this configuration, the real-world object is responsible for notifying a single object, the ViewProxy, whenever it changes in a manner that may affect its representation. A conservative implementation would notify the ViewProxy whenever anything changed. Another implementation might attempt to make intelligent decisions about what changes to report but the real-world object has no knowledge about what views are (or may be in the future) available and which one is active so it may be advisable to report all changes. The ViewProxy serves as the collection point for all the available views for an object. Its role is to accept notification from the real-world object and to forward it to all the available views. The ViewProxy does not restrict its forwarding based on the active view because doing so means that only the active view would accurately represent the current state of the model and when the active view was changed, the new active view would have to be made current, reducing response time.

The view objects are responsible for creating and managing a particular presentation of a particular object. They have access to the object to obtain whatever information they need and as long as they are notified when the object changes, they can quickly provide a current representation of the object on demand. The view managers maintain a list of view objects of a particular type (eg. list or icon) and are responsible for managing the geometry of the objects within a particular window or presentation space and for distributing and allocating user requests to the individual view objects they manage.

Figure 4:
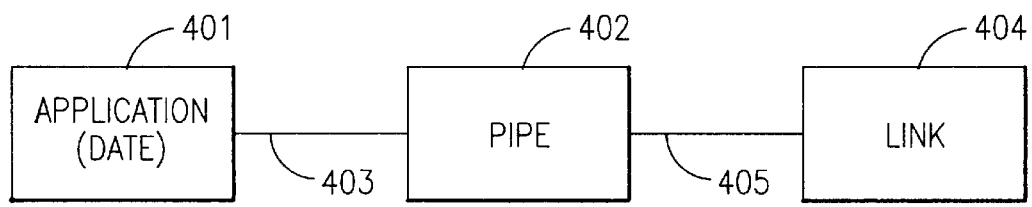
FIG. 4 is a block diagram showing the establishment of an application which may be presented in views of the program of FIG. 1.

FIG. 4 is an illustration of the establishment of an application which may be illustrated in Views of the present invention. Consider the situation wherein the Controller 100 of FIG. 1 performs the following:

TABLE I

1. Create an application (for instance the "date" command);
2. Create a pipe;
3. Connect the output of application to the pipe;
4. Create a link;
5. Connect the output of pipe to the link;
6. Run the application; and
7. Show list view.

Figure 5:
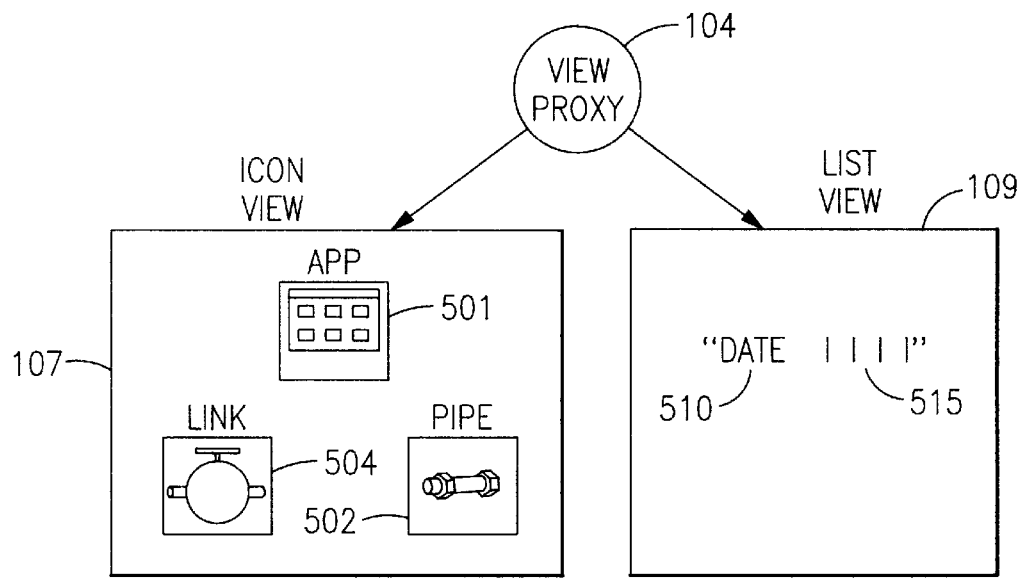
FIG. 5 is a block diagram illustrating two views of the ViewProxy for the application of FIG. 2.

FIG. 4 illustrates the actions of the controller in Table I wherein the creation of the application (date) is shown at 401, next the pipe 402 is created, then the application is connected to the pipe at 403, then the link is created at 404, and the pipe is connected to the link at 405. FIG. 5 is an illustration of a portion of the system of FIG. 1 and shows the ViewProxy 104 providing the icon view 107 and list view 109 as they would be developed by the controller 100. In the icon view 107, the application would be added to the icon view 107 as 501 at step 1 of Table I. At the same time the entry "DATE" would be added at 510 of the list view 109 to show that the application had been created. Step 2 of Table I would be shown in the icon view 107 as pipe icon 502. However, there would be no change in the list view 109. Step 3 of Table I would not be shown in either of the views 107 or 109. Step 4, the creation of the link would be shown by adding the icon 504 to the icon view 107, but there would be no change to the list view 109. Step 5 would be shown in the list view 109 by adding the place holders "|||||" to the view, as shown at 515, however there would be no change to the icon view 107. Finally, the application would be run, which may be shown in the icon view 107 by, for instance, changing the color of the icon 501 and changing the "|||||" text icon to ">>>>>". At step 7 of Table I, the list view 109 would be made active, to display the list view 109 by the windowing system, as is well understood by those skilled in the art. It will thus be understood, that the ViewProxy 104 determines which view is to receive data, and which data will be sent to the view.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A system for controlling multiple appearances of data on a display, said system comprising:
   a Controller for receiving user instructions for data to be displayed, and for generating model management and view management instructions for controlling the appearance of data to be displayed;
   a single Model connected to said Controller for receiving model management instructions from said Controller, and for keeping track of changes to the appearance of data to be displayed;
   a ViewProxy connected to said controller for receiving view management instructions, and connected to said single Model for receiving model change notifications responsive to changes in the appearances of data to be displayed, said model change notifications representing the current state of the Model; and
   multiple Views connected to said ViewProxy for receiving model change notifications, said ViewProxy determining to which Views model change notifications are to be sent, and sending model change information to only those Views affected by said model changes such that the Views continually represent the current state of the Model.

2. The system of claim 1 wherein said Views comprise a graphical view for displaying an icon view of the data to be displayed, and a text view showing a list of the data to be displayed.

3. The system of claim 2 further including a windowing system for displaying only active Views, and for switching between Views by making at least one View active and selected other Views inactive.

4. A method for controlling multiple appearances of data on a display, said method comprising:
   receiving user instructions by a Controller for data to be displayed;
   generating model management and view management instructions by said Controller for controlling the appearance of data to be displayed;
   receiving model management instructions by a single Model from said Controller;
   keeping track of changes to the appearance of data to be displayed by said Model;
   receiving view management instructions by a ViewProxy from said Controller;
   receiving by said ViewProxy, model change notifications responsive to changes in the appearances of data to be displayed, said model change notifications representing the current state of the Model;
   determining by said ViewProxy, which of multiple Views model change notifications are to be sent; and
   sending model change information to only those Views affected by said model changes such that the Views continually represent the current state of the Model.

5. The method of claim 4 further comprising:
   displaying with one of said Views, a graphical view showing an icon view of the data to be displayed; and
   displaying with another of said Views, a text view showing a list view of the data to be displayed.

6. An article comprising:
   a computer readable medium on which is recorded a program product for controlling multiple appearances of data on a display, said program product comprising:
   a computer program routine for receiving user instructions by a Controller for data to be displayed;
   a computer program routine for generating model management and view management instructions by said Controller for controlling the appearance of data to be displayed;
   a computer program routine for receiving model management instructions by a single Model from said Controller;
   a computer program routine for keeping track of changes to the appearance of data to be displayed by said Model;
   a computer program routine for receiving view management instructions by a ViewProxy from said Controller;
   a computer program routine for receiving by said ViewProxy, model change notifications responsive to changes in the appearance of data to be displayed, said model change notifications representing the current state of the Model;

a computer program routine for determining by said ViewProxy, which of multiple Views model change notifications are to be sent; and a computer program routine for sending model change information to only those Views affected by said model changes such that the Views continually represent the current state of the Model.

7. The article of claim 4 wherein said program product further comprises:

a computer program routine for displaying with one of said Views, a functional view showing an icon view of the data to be displayed; and a computer program routine for displaying with another of said Views, a real view showing a list view of the data to be displayed.

8. The article of claim 5 wherein said program product further comprises:

a computer program routine for displaying with a windowing system, only active Views; and a computer program routine for switching with said windowing system, between Views by making at least one View active and selected other Views inactive.

* * * * *